United States Patent
Lochel

(10) Patent No.: US 9,243,209 B2
(45) Date of Patent: *Jan. 26, 2016

(54) CORN STILLAGE OIL DERIVATIVES

(71) Applicant: Cargill, Incorporated, Wayzata, MN (US)

(72) Inventor: Frank P. Lochel, Delano, MN (US)

(73) Assignee: CARGILL, INCORPORATED, Wayzata, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/329,025

(22) Filed: Jul. 11, 2014

(65) Prior Publication Data

US 2014/0323750 A1 Oct. 30, 2014

Related U.S. Application Data

(62) Division of application No. 13/321,864, filed as application No. PCT/US2010/035841 on May 21, 2010, now Pat. No. 8,779,172.

(60) Provisional application No. 61/180,654, filed on May 22, 2009.

(51) Int. Cl.
C11B 3/14 (2006.01)
C11B 13/00 (2006.01)
C11C 3/00 (2006.01)
C11B 3/02 (2006.01)

(52) U.S. Cl.
CPC ... *C11B 3/14* (2013.01); *C11B 3/02* (2013.01); *C11B 13/00* (2013.01); *C11C 3/006* (2013.01); *Y02W 30/74* (2015.05)

(58) Field of Classification Search
None
See application file for complete search history.

(56) References Cited

U.S. PATENT DOCUMENTS

| | | | |
|---|---|---|---|
| 1,790,494 A | 1/1931 | Adams et al. |
| 2,569,124 A | 9/1951 | Christenson et al. |
| 2,657,224 A | 10/1953 | Bierke |
| 4,330,625 A | 5/1982 | Miller et al. |
| 4,552,775 A | 11/1985 | Baeling et al. |
| 4,589,990 A | 5/1986 | Zehler et al. |
| 4,650,598 A | 3/1987 | Roberts et al. |
| 5,512,313 A | 4/1996 | Cooper et al. |
| 6,312,826 B1 | 11/2001 | Shogren |
| 6,443,661 B1 | 9/2002 | Wathen |
| 6,476,244 B2 | 11/2002 | Mahlum |
| 6,589,442 B1 | 7/2003 | Wilson et al. |
| 6,759,542 B2 | 7/2004 | Mahlum |
| 6,822,105 B1 | 11/2004 | Luxem et al. |
| 7,601,858 B2 | 10/2009 | Cantrell et al. |
| 7,608,729 B2 | 10/2009 | Winsness et al. |
| 7,989,647 B2 | 8/2011 | Geiger et al. |
| 8,008,516 B2 | 8/2011 | Cantrell et al. |
| 2004/0087808 A1 | 5/2004 | Prevost et al. |
| 2006/0107859 A1 | 5/2006 | Sampei |
| 2007/0004811 A1 | 1/2007 | Bruner et al. |
| 2007/0089356 A1 | 4/2007 | Krasutsky et al. |
| 2007/0260080 A1 | 11/2007 | Lee et al. |
| 2008/0190567 A1 | 8/2008 | Winsness |
| 2008/0299632 A1 | 12/2008 | Winsness et al. |
| 2009/0076913 A1 | 3/2009 | Morgan |
| 2009/0123609 A1 | 5/2009 | Harris et al. |
| 2009/0287007 A1 | 11/2009 | Abraham et al. |
| 2010/0036177 A1 | 2/2010 | Ward |
| 2011/0054098 A1 | 3/2011 | Tutin et al. |

FOREIGN PATENT DOCUMENTS

| | | |
|---|---|---|
| WO | 0162880 | 8/2001 |
| WO | 2007088421 | 8/2007 |
| WO | 2010135637 | 11/2010 |

OTHER PUBLICATIONS

Sievers, A.F., et al., The preparation of an edible oit from crude corn oil, 1922, USDA, Bulletin No. 1010, pp. 1-25 (26 pages).
Edgar S. Lower, "Blown (air oxidised) vegetable & marine oils & paint manufacutre," Pigment and Resin Technology, May 1987, pp. 7-10.
N. Singh & M. Cheryan, "Extraction of Oil From Corn Distillers Dried Grains with Solubles," Transactions of the ASAE, 1998 American Sodety of Agricultural Engineers, vol. 41, pp. 1775-1777.

*Primary Examiner* — Yate K Cutliff
(74) *Attorney, Agent, or Firm* — Cargill, Incorporated

(57) ABSTRACT

Corn stillage oil derivatives having values for Gardner color of 10 or less and methods for making the corn stillage oil derivatives are disclosed. In one aspect, the corn stillage oil derivative comprises a heat bleached corn stillage oil. Preferably, the heat bleached corn stillage oil has a value for Gardner color of from 4 to 8. In another aspect, the corn stillage oil derivative comprises a blown corn stillage oil. Preferably, the blown corn stillage oil has a value for Gardner color of from 5 to 8.

20 Claims, No Drawings

CORN STILLAGE OIL DERIVATIVES

CROSS REFERENCE TO RELATED APPLICATION

This application is a divisional of U.S. patent application Ser. No. 13/321,864, filed 22 Nov. 2011, entitled CORN STILLAGE OIL DERIVATIVES, which is a national stage entry of International Patent Application No. PCT/US2010/035841, filed 21 May 2010, entitled CORN STILLAGE OIL DERIVATIVES, which application claims the benefit of U.S. Provisional Patent Application Ser. No. 61/180,654, filed 22 May 2009, entitled CORN STILLAGE OIL DERIVATIVES, which applications are hereby incorporated by reference in their entirety.

FIELD

The present disclosure relates to corn stillage oil derivatives having a value for Gardner color of 10 or less. In one aspect, the corn stillage oil derivatives comprise a heat bleached corn stillage oil. In another aspect, the corn stillage oil derivatives comprise a blown corn stillage oil.

BACKGROUND

Ethanol production from corn has increased in recent years. The corn is typically ground to a course powder that is then mixed with water and yeast and fermented to produce a fermented mixture (sometimes referred to as "mash") that contains residual solids, ethanol and other liquids. The other liquids include water, monoglycerides, diglycerides, triglycerides, glycerin, and free fatty acids. Typically, the liquid portion of the mash is heated to distill off the ethanol, which is captured and sold as an additive for automotive fuels.

The residual liquid remaining after the ethanol is removed contains free fatty acids and glycerol and from 1% to 3% by weight monoglycerides, diglycerids, triglycerides. The residual liquid from the distillation has generally been sold together with the solids portion of the mash as "distillers' dry grain." The distillers' dry grain generally is used as feed for livestock.

SUMMARY

The inventors have surprisingly discovered that the monoglycerides, diglycerides, triglycerides, free fatty acids, and glycerol (hereinafter collectively referred to as "corn stillage oil") can be recovered from the other residual liquids of the distillation process by suitable means, preferably by centrifugation of the residual material remaining after the ethanol has been distilled off. Centrifugation typically recovers twenty five percent of the corn stillage oil originally present in the residual material being centrifuged.

The corn stillage oil recovered by centrifugation typically: has an acid value from 15 to 33 mg KOH/gram (for example from 16 to 32 mg KOH/gram, and in some instances from 18 to 30 mg KOH/gram); has an iodine value from 110 to 125 g $I_2$/100 g sample; has a value for Gardner color of greater than 12, typically from 14 to 18, and often from 15 to 16; and contains from 0.05 to 0.29 percent by weight monoglycerides, from 1.65-7.08 percent by weight diglycerides, from 70.00 to 86.84 percent by weight triglycerides, from 8 to 16 percent by weight (for example, from 9 to 15 percent by weight) free fatty acids, and from 0.00 to 0.20 weight percent glycerin.

Typically, the corn stillage oil has from 53 to 55 percent by weight groups derived from diunsaturated fatty acids, from 39 to 43 percent by weight groups derived from monounsaturated fatty acids, from 15 to 18 percent by weight groups derived from saturated fatty acids, and from 1 to 2 percent by weight groups derived from triunsaturated fatty acids. The groups derived from each of the above fatty acids are present either as groups within the mono-, di-, and tri-glycerides or as free fatty acids.

The free fatty acid content of the corn stillage oil is very high compared to conventional vegetable oils. Surprisingly, the inventors have discovered processes that can be readily used to process the high fatty acid containing stillage oil to provide beneficial products.

The corn stillage oil is heated to at least 90° C. to produce a corn stillage oil derivative having a relatively low value of Gardner color. Typically, the corn stillage oil is heat treated at a desired temperature for a desired time to produce a corn stillage oil derivative having a value for Gardner color of 10 or less.

In one particularly preferred aspect, the corn stillage oil is heated to a temperature of typically from 90° C. to 125° C., preferably from 100° C. to 120° C., and more preferably from 105° C. to 115° C. and air is passed through it (commonly referred to as "sparging") for a desired period of time. The value for Gardner color of the corn stillage oil will begin to reduce as the oil is heated, will reach a minimum and then begin to increase if the heated oil is sparged for too long a period. The time period is long enough to reduce the color of the oil to the desired value, and is short enough so that the value for Gardner color for the corn stillage oil is 10 or less, preferably from 5 to 8. The oil is typically under a slight vacuum while the air is being sparged through it. This process polymerizes the components of the corn stillage oil and introduces hydroxyl, epoxy functionality and ether linkages. The process of sparging air through a vegetable oil is often referred to as "blowing" the oil and the resulting oil is often referred to as a "blown oil." As described below, the inventors have surprisingly discovered that blowing vacuum distilled corn stillage oil (as described below) results in a blown corn stillage oil having a significantly lower value for Gardner color than blown corn stillage oils resulting from blowing pressure distilled corn stillage oil (as described below).

The resulting blown-corn stillage oil can be further processed in order to provide final products that can be used in various end-use applications.

In another particularly preferred aspect, the corn stillage oil is heated to a temperature of at least 220° C. (for example from 255° C. to 265° C.) and maintained at atmospheric pressure for typically from 45 minutes to 180 minutes to reduce the value for Gardner color of the resulting corn stillage oil derivative to 10 or less, preferably from 4 to 8. This heat treatment is referred to herein as "heat bleaching" the oil and the resulting corn stillage oil derivative is referred to as a "heat bleached corn stillage oil". The heat bleached corn stillage oil typically comprises at least 65% by weight triglycerides, preferably at least 70% by weight triglycerides. As described below, the inventors have surprisingly discovered that heat bleaching vacuum distilled corn stillage oil (as described below) results in a heat bleached corn stillage oil having a significantly lower value for Gardner color than heat bleached corn stillage oils resulting from heat treating pressure distilled corn stillage oil (as described below).

Surprisingly, the inventor has discovered that a titre (as described below) typically is reduced to less than one percent by weight (1 wt %) by heating the corn stillage oil according to both the preferred aspects mentioned above.

DETAILED DESCRIPTION

"Flash Point" or "Flash Point Temperature" is a measure of the minimum temperature at which a material will initially flash with a brief flame. It is measured according to the method of ASTM D-92 using a Cleveland Open Cup and is reported in degrees Celsius (° C.).

"Pour Point" or "Pour Point Temperature" is a measure of the lowest temperature at which a fluid will flow. It is measured according to the method of ASTM D-97 and is reported in degrees Celsius (° C.).

"Iodine Value" (IV) is defined as the number of grams of iodine that will react with 100 grams of material being measure. Iodine value is a measure of the unsaturation (carbon-carbon double bonds and carbon-carbon triple bonds) present in a vegetable oil or vegetable oil derivative (such as a blown oil or heat bleached oil). Iodine Value is reported in units of grams iodine ($I_2$) per 100 grams material and is determined using the procedure of AOCS Cd Id-92.

"Hydroxyl number" (OH#) is a measure of the hydroxyl (—OH) groups present in a material. It is reported in units of mg KOH/gram material and is measured according to the procedure of ASTM E1899-02.

"Acid Value" (AV) is a measure of the residual hydronium groups present in a compound and is reported in units of mg KOH/gram material. The acid number is measured according to the method of AOCS Cd 3d-63.

"Gardner Color Value" is a visual measure of the color of a material. It is determined according to the procedure of ASTM D1544, "Standard Test Method for Color of Transparent Liquids (Gardner Color Scale)". The Gardner Color scale ranges from colors of water-white to dark brown defined by a series of standards ranging from colorless to dark brown, against which the sample of interest is compared. Values range from 0 for the lightest to 18 for the darkest. For the purposes of the invention, the Gardner Color Value is measured on a sample of material at a temperature of 25° C.

Recovery of Corn Stillage Oil

Fermented mash comprising ethanol, water, residual grain solids (including proteins, fats, and unfermented sugars and carbohydrates), and from 1 to 3 percent by weight corn stillage oil is heated to distill and recover ethanol from the fermented mash. Typically, the ethanol is distilled by two methods.

In the first method, the fermented mash is heated to temperatures typically from 76° C. to 99° C. under vacuum typically from 50 to 300 torr (for example from 150 to 250 torr) to distill off the desired ethanol. An example of this first method is the ethanol distillation process available from ICM, Incorporated (hereinafter the "ICM Process").

In the second method, the fermented mash is heated to temperatures typically from 235° F. to 250° F. under pressures typically from 1 to 25 psig (for example from 1 to 25 psig) to distill off the desired ethanol. An example of this second method is the process available from Delta-T Corporation (hereinafter the "Delta-T Process").

For both the first and second method, after the ethanol is distilled off, the remaining material typically contains from 1 wt % to 4 wt % corn stillage oil. The material remaining after the ethanol is distilled off is typically centrifuged using a centrifuge, such as a Westfalia sliding disk centrifuge available from Westfalia Corporation. From 25 wt % to 35 wt % of the corn stillage oil contained in the liquid is recovered from the liquid during this centrifugation step. The recovered unprocessed corn stillage oil typically exhibits a Gardner color of 12 or greater, for example, a Gardner color of from 14 to 18.

Corn stillage oil produced from the residual material of the first distillation method is hereinafter referred to as "vacuum distilled corn stillage oil." Corn stillage oil produced from the residual material of the second distillation method is hereinafter referred to as "pressure distilled corn stillage oil." Vacuum distilled corn stillage oil is preferably utilized in the method of this invention.

Unprocessed corn stillage oil typically exhibits: a viscosity at 40° C. of from 25 to 35 cSt, for example from 28 to 31 cSt as measured utilizing viscosity tubes in a constant temperature bath as further described below; a viscosity at 100° C. of from 5 to 10 cSt, for example from 6 to 9 cSt as measured utilizing viscosity tubes in a constant temperature bath as further described below; a Viscosity Index of from 80 to 236 determined using the procedures and measurement scale established by the Society of Automotive Engineers; a flash point from 220° C. to 245° C., for example from 225° C. to 240° C.; a saponification value of from 170 to 206 mg KOH/g; a pour point typically of from −5° C. to −14° C.; an acid value of from 15 to 33 mg KOH/gram (for example, from 16 to 32 mg KOH/gram); an iodine value from 110 to 125 grams $I_2$/100 grams sample; and from 8 to 16 wt % (for example, from 9 to 15 wt %) free fatty acids.

The viscosity for this invention is measured according to the method of ASTM D445. In this method oil to be tested is placed in a calibrated glass capillary viscometer, which is then placed into a constant temperature bath at the temperature specified. Once thermal equilibrium is reached, the oil is drawn up into the reservoir of the capillary tube. As the fluid drains, it passes the top mark on the tube and a timer is started. When the oil passes the lower mark, the timer is stopped and the flow time is recorded. The recorded flow time is multiplied by a factor which is specific to each viscometer tube. The resultant product of the flow time multiplied by the factor is reported as viscosity in cSt at the test temperature.

Unprocessed corn stillage oil also typically contains two phases at 25° C. The first phase is the liquid phase, which settles toward the top of any container that contains the corn stillage oil. This phase typically is reddish in color. The second phase is a solid that typically settles toward the bottom of any container containing the oil. At 62° C., the second phase tends to dissolve into the liquid phase, but will settle out again if the untreated corn stillage oil is cooled to room temperature. The inventors have determined that the second solid phase typically makes up at least 4 percent by weight (4 wt %) of the total unprocessed corn stillage oil. For example, the second solid phase may make up from 5 wt % to 12 wt % of the unprocessed corn stillage oil. For purposes of this invention, this second solid phase is referred to as the "titre."

Heat Bleaching the Corn Stillage Oil

The corn stillage oil typically is heated to a temperature of from 220° C. to 270° C., preferably from 240° C. to 270° C., and more preferably from 255° C. to 265° C. The vessel containing the corn stillage oil during heating typically is at atmospheric pressure. The corn stillage oil is maintained at this temperature and pressure for sufficient time to lower the value for Gardner color to 10 or less, preferably from 4 to 8. For example, the corn stillage oil may be heated to a temperature of 255° C. to 265° C. for from 45 to 90 minutes (preferably from 50 to 70 minutes) until the value for the Gardner color of the oil is reduced to 10 or less, preferably from 4 to 8.

In an another example, the corn stillage oil is heated to a temperature of from 225° C. to 240° C. and maintained at atmospheric pressure for typically from 120 to 180 minutes (preferably from 120 to 150 minutes) to reduce the value for Gardner color of the resulting corn stillage oil derivative to 10 or less, preferably from 4 to 8.

The heat bleached corn stillage oil typically comprises at least 65% by weight triglycerides, and preferably at least 70% by weight triglycerides.

During the heat bleaching, oxygen is purged from the vessel and a nitrogen blanket is maintained on top of the oil, to minimize any oxidation reactions.

As described earlier, vacuum distilled corn stillage oil preferably is utilized to facilitate lower values for Gardner color are obtained.

Blowing the Corn Stillage Oil

The blowing typically is achieved by sparging air through corn stillage oil heated to at least 90° C., typically from 90° C. to 125° C., preferably from 100° C. to 120° C., and more preferably from 105° C. to 115° C. The vessel containing the corn stillage oil during the blowing step typically is under a slight vacuum. The pressure of the air being sparged through the oil is generally high enough to achieve the desired air flow through the corn stillage oil. The air is introduced at a sufficient flow rate for the sufficient period of time to achieve the desired viscosity. Typically, the air is introduced into the corn stillage oil at a rate of 0.009 to 0.011 cubic feet per minute per pound of corn stillage oil present. Typically, the air is dispersed evenly in the vessel to maximize surface area exposure. The vessel preferably will have a distribution ring or spoke-like header to create small volume bubbles evenly within the oil. The duration of sparging air through the corn stillage oil is varied and determined according to the desired properties of the blown oil and the end-use applications for the resulting product. Additionally, air is sparged through the oil for a sufficient time to reduce the Gardner color to a value of 10 or less. If air is sparged through the oil for too long, the value for Gardner color will increase again to greater than 10.

Surprisingly, the inventors have discovered that the corn stillage oil described above, can be effectively reacted with air to provide blown-corn stillage oil which advantageously has a relatively high level of polymerization, as shown by their increased viscosities at 40° C. and 100° C. (typically above 50 cSt @ 40° C. preferably above 60 cSt @ 40° C., more preferably above 130 cSt @ 40° C.; and above 9 cSt 100° C., preferably above 10 cSt @ 100° C., more preferably above 12 cSt). The corn stillage oil is blown until the viscosity at 40° C. typically is less than 250 cSt, preferably less than 225 cSt, and more preferably less than 200 cSt. Limiting the time duration of blowing will help facilitate the value for Gardner color is 10 or less, preferably from 5 to 8. When the air is introduced as described above, with even dispersion and small volume bubbles, the corn stillage oil typically will be blown for from 3 hours to 12 hours, preferably from 4 hours to 10 hours. Longer sparging times will be necessary if the air is not evenly dispersed within the oil and/or the volume of the air bubbles are larger.

For large size reactors, for example reactors able to blow 45,000 pounds of oil, even with good dispersion and small volume air bubbles, it may typically take longer (from 20 to 60 hours) to blow the oil to the desired viscosity (when the oil is at a temperature of from 105° C. to 115° C. at atmospheric pressure, at the rates described above, to achieve these desired viscosities. Longer sparging times typically will be necessary if the air is not evenly dispersed within the oil and/or the volume of the air bubbles are relatively larger.

Surprisingly, the acid value for the blown corn stillage oil is not significantly increased compared to the acid value for the unblown corn stillage oil. Typically, the acid value does not increase when corn stillage oil is blown. Preferably, the blown corn stillage oil comprises relatively no more than 10 relative percent more free fatty acids than the starting unblown corn stillage oil, and more preferably, the free fatty acid content of the blown corn stillage oil is equivalent to the free fatty acid content of the starting corn stillage oil.

That the free fatty acid content of blown stillage oil is not significantly higher than the free fatty acid value for the starting unblown corn stillage oil, is unexpected as the acid value for other vegetable oils, such as soybean oil does increase significantly when the oil is blown. For example, a sample of soybean oil with an acid value of less than 0.1 mg KOH/g when blown to a viscosity of 130 cSt @ 40° C. typically has an acid value of 9 to 11 mg KOH/gram, or more. Generally, the acid value of a vegetable oil increases significantly when air is blown into the oil at temperatures above 100° C. As the blown-corn stillage oil does not have significantly higher acid value than the unblown corn stillage oil, the blown corn stillage oil can be effectively stripped of volatiles, such as free fatty acids, using conventional stripping equipment and methods.

The reactions that occur during the blowing of the oil increase the molecular weight of the oil, which tends to increase the viscosity of the blown oil versus the unblown oil. These viscosity building reactions include epoxidation and subsequent ether formations. Additionally, the blowing process introduces hydroxyl functionality onto the resulting oil, which also tends to increase the viscosity of the oil. The blown-corn stillage oil typically has a hydroxyl number from 5 to 80 mg KOH/gram oil, preferably from 8 to 60 mg KOH/gram oil. The higher viscosity (especially at higher temperature) provides the blown oil with better hydrodynamic lubrication properties than the unblown corn stillage oil. The excellent lubrication potential for the blown corn stillage oils is exemplified by their relatively high values for viscosity index.

The inventors also have surprisingly discovered that corn stillage oil can be more readily blown to desired viscosities, such as 70 cSt, than soybean oil under the same blowing conditions. For example, air was sparged through corn stillage oil and soybean oil maintained at 100° C. and atmospheric pressure to determine how long it would take each to build viscosity. As can be seen from Table 1, below, the blown corn stillage oil's viscosity increased much quicker and reached a viscosity of 70.9 cSt at 40° C. in 25.5 hours versus the blown soybean oil, which took 39.5 hours to reach a viscosity of 71.8 cSt at 40° C. under similar conditions. Therefore, it takes at least 20% less time for the blown corn stillage oil to reach approximately 71 cSt at 40° C. than a blown soybean oil to reach a similar viscosity, and in some instances at least 25% less time, preferably at least 30% less time and more preferably at least 35% less time for the blown corn stillage oil to reach a given viscosity at 40° C. than a blown soybean oil under similar blowing conditions.

Optionally, a catalyst may be used in some embodiments to enhance the blowing of the oil. Examples of catalysts that may be useful include peroxides, and catalysts comprising metals selected from the group consisting of Transition Elements and Group IV metals as described in "McGraw-Hill Dictionary of Scientific and Technical Terms," Appendix 7 (Fifth Edition 1994).

Further examples of catalysts that may be useful for enhancing the blowing procedure include catalysts comprising metals related from the group consisting of: tin, cobalt, iron, zirconium, titanium and combinations thereof.

TABLE 1

| TIME at 100° c. (Hrs) | 0 | 1 | 2.25 | 3.25 | 6.25 | 11 | 12 | 13.25 |
|---|---|---|---|---|---|---|---|---|
| Blown, corn stillage oil | 33 | 33 | 33 | 33 | 33 | 39.4 | 39.6 | 39.7 |
| Blown soybean oil | | | | | | | | |

Viscosity at 40° C. (cSt)

| TIME at 100° c. (Hrs) | 16 | 16.75 | 19 | 21.25 | 23.5 | 25.5 | 32.5 | 39.5 |
|---|---|---|---|---|---|---|---|---|
| Blown, corn stillage oil | | 45.9 | 46.7 | 51.4 | 63.8 | 70.9 | | |
| Blown soybean oil | 41.7 | | | | 44.5 | | 53.4 | 71.8 |

Viscosity at 40° C. (cSt)

As discussed earlier, the blown corn stillage oil has a value for Gardner color of 10 or less, preferably from 5 to 8.

End-Use Applications

The relatively low values for Gardner color for the corn stillage oil derivatives of this invention result in the corn stillage oil derivative being useful for several end-use applications where relatively low color is beneficial, for example the corn stillage oil derivative of the invention may be used as: base materials for the manufacture of alkyd resins (typically used in the coatings and ink industries); fluids for reducing the dust created when a surface is agitated or perturbed (hereinafter "de-dust fluids"); lubrication oils for machinery (such as the machinery utilized in a textile mill); mold release fluids for concrete applications; fluids for use as adjuvants in the manufacture of agricultural chemicals; and metal forming operations such as stamping.

EXAMPLES

The following examples are presented to illustrate the present invention and to assist one of ordinary skill in making and using the same. The examples are not intended in any way to otherwise limit the scope of the invention.

Example 1 Production of Vacuum Distilled Corn Stillage Oil

The vacuum distilled corn stillage oil of example 1 is made according to the ICM Process. This process exposes the fermented corn mash to temperatures of about 82.2° C. under a vacuum of from about 50 to about 300 torr to distill off ethanol. The corn stillage oil is recovered by centrifuging the materials remaining after the distillation to recover the vacuum distilled corn stillage oil. The properties of the vacuum distilled corn stillage oil is set forth below in Table 2. While not measured, the vacuum distilled corn stillage oil is believed to contain from about 5 to about 12 percent by weight titre.

TABLE 2

Properties of Vacuum Distilled Corn Stillage Oil

| | Sample No. 2-1 |
|---|---|
| 40° C. Viscosity (cSt) | 31 |
| 100° Viscosity (cSt) | 8 |
| Viscosity Index | 249 |
| Flash Point (° C.) | 238 |
| Saponification Value (mg KOH/g) | 202 |
| Pour Point Temperature (° C.) | −7 |
| Acid Value (mg KOH/gram) | 22.2 |
| Free Fatty Acid (wt %) | 11.1 |
| Iodine value (gram I$^2$/100 grams) | 122 |
| Gardner Color | 15 |
| Hydroxyl number (mg KOH/gram) | 9 |

Example 1a Production of Pressure Distilled Corn Stillage Oil

The pressure distilled corn stillage oil of example 1a is made according to the Delta T Process. In this process the fermented corn mash is exposed to temperatures of about 121° F. at pressures of from about 20 psig to about 150 psig to distill off ethanol. The pressure distilled corn stillage oil is recovered by centrifuging the material remaining after the distillation to recover the pressure distilled corn stillage oil. The properties of the pressure distilled corn stillage oil is set forth below in Table 2a. While not measured, the pressure distilled corn stillage oil is believed to contain from about 5 to about 12 percent by weight titre.

TABLE 2a

Properties of Pressure Distilled Corn Stillage Oils

| | Sample No. 2-1a |
|---|---|
| 40° C. Viscosity (cSt) | 31 |
| 100° Viscosity (cSt) | 8 |
| Viscosity Index | 249 |
| Flash Point (° C.) | 238 |
| Saponification Value (mg KOH/g) | 202 |
| Pour Point Temperature (° C.) | −7 |
| Acid Value (mg | 23 |

TABLE 2a-continued

Properties of Pressure Distilled Corn Stillage Oils

| | Sample No. 2-1a |
|---|---|
| KOH/gram) | |
| Free Fatty Acid (wt %) | 11.5 |
| Iodine value (gram $I^2$/100 grams) | 118 |
| Gardner Color | 16 |
| Hydroxyl number (mg KOH/gram) | 9 |

Example 2 Blowing the Corn Stillage Oils

Into a 2000 milliliter glass reactor equipped with a stirrer, a heating mantel, a temperature regulator and air blowing tubes, 1200 grams of corn stillage oil, as indicated in Table 3, is charged. The corn stillage oil is heated to 105° C. Air is sparged through the oil as it is heated. The air is sparged through the oil at a rate that maximizes the rate while at the same time causes a relatively even distribution of air bubbles within the oil. The rate of sparging is generally limited by the volume of the reactor. The speed with which viscosity increases is directly proportional to the rate at which air is being blown into the corn stillage oil, and indirectly proportional to the size of the air bubbles. The smaller the air bubbles, the more surface area the faster the reaction. The oil within the reactor is tested periodically to determine the viscosity at 40° C. of the blown oil. When the desired viscosity is obtained, the air sparging is stopped and the reactor is allowed to cool. Air was sparged through each of the samples for approximately 22 hours. The properties of the resulting blown oils are set forth in Table 3.

TABLE 3

Properties of Blown Corn Stillage Oil

| | Sample No. | |
|---|---|---|
| | 3-1 | 3-3 |
| Corn Stillage Oil Used | Sample 2-1 | Sample 2-1a |
| 40° C. Viscosity (cSt) | 55 | 56 |
| 100° Viscosity (cSt) | 11 | 11 |
| Viscosity Index | 199 | 195 |
| Flash Point (° C.) | 284 | 277 |
| Saponification Value (mg KOH/g) | 190 | 193 |
| Pour Point Temperature (° C.) | −9 | −9 |
| Acid Value (mg KOH/gram) | 19 | 21 |
| Free Fatty Acid (wt %) | 9.5 | 10.5 |
| Iodine value (gram $I^2$/100 grams) | 120 | 123 |
| Gardner Color | 6 | 9 |
| Hydroxyl number (mg KOH/gram) | 9 | 12 |

As can be seen from Table 3, the value of Gardner color for the blown oil made from the vacuum distilled corn stillage oil is much lower than the value of Gardner color for the blown oil made from the pressure distilled corn stillage oil. In addition, while not measured, the blown corn stillage oils of Table 3 are believed to contain less than one percent by weight titre.

Example 3 Heat Bleaching Corn Stillage Oil

To a 2000 milliliter glass reactor equipped with a stirrer, heating mantel, temperature controller and a nitrogen sparge, 1000 grams of the corn stillage oil indicated in Table 4 is charged. Nitrogen is sparged through the corn stillage oil to remove air from the reactor and then the oil is heated to 260° C., while continuing to sparge nitrogent through the oil. the oil is observed to change color with time. The oil is maintained at approximately 260° C. for about 45 to 60 minutes until the desired value for Gardner color is obtained and the color is no longer reducing.

The properties of the resulting heat bleached corn stillage oil derivative (heat bleached corn stillage oil) is set forth below in Table 4.

TABLE 4

Properties of Heat Bleached Corn Stillage Oil

| | Sample No. | |
|---|---|---|
| | 4-1 | 4-2 |
| Corn Stillage Oil Used | Sample 2-1 | Sample 2-1a |
| 40° C. Viscosity (cSt) | 36 | 34 |
| 100° Viscosity (cSt) | 8 | 7 |
| Viscosity Index | 205 | 174 |
| Flash Point (° C.) | 230 | 232 |
| Saponification Value (mg KOH/g) | 199 | 197 |
| Pour Point Temperature (° C.) | −5 | −5 |
| Acid Value (mg KOH/gram) | 21 | 19 |
| Free Fatty Acid (wt %) | 10.5 | 9.5 |
| Iodine value (gram $I^2$/100 grams) | 112 | 114 |
| Gardner Color | 6 | 10 |
| Hydroxyl number (mg KOH/gram) | 8 | 9 |

As can be seen from Table 4, the value of Gardner color for the heat bleached corn stillage oil made from the vacuum distilled corn stillage oil is much lower than the value of Gardner color for the heat bleached corn stillage oil made from the pressure distilled corn stillage oil. In addition, while not measured, the heat bleached corn stillage oils of Table 4 are believed to contain less than one percent by weight titre.

What is claimed is:

1. A method for producing a blown corn stillage oil, the method comprising:
   (a) obtaining a corn stillage oil having a viscosity of from 25 to 35 cSt at 40° C.;
   (b) heating the corn stillage oil to at least 90° C. for a sufficient period of time to obtain a corn stillage oil derivative; and
   (c) passing air through the corn stillage oil derivative to produce a blown corn stillage oil.

2. The method of claim 1, wherein the blown corn stillage oil has a viscosity of at least 50 cSt at 40° C.

3. The method of claim 1, wherein the blown corn stillage oil exhibits a viscosity at 100° C. of at least 8 cSt.

4. The method of claim 1, wherein the blown corn stillage oil has a viscosity less than 250 cSt at 40° C.

5. The method of claim 1, wherein the blown corn stillage oil has a Gardner color of 5 to 8.

6. The method of claim 1, wherein step (c) comprises passing air through the corn stillage oil derivative for from 3 hours to 12 hours.

7. The method of claim 1, wherein the corn stillage oil of step (a) comprises from 9 wt % to 15 wt % free fatty acids.

8. The method of claim 7, wherein the blown corn stillage oil has at most 10 relevant percent more free fatty acids than the corn stillage oil of step (a).

9. A method for producing a blown-corn stillage oil, the method comprising:
   (a) obtaining a vacuum distilled corn stillage oil having a viscosity of from 25 to 35 cSt at 40° C.;
   (b) heating the corn stillage oil to at least 90° C. for a sufficient period of time to obtain a corn stillage oil derivative; and
   (c) passing air through the corn stillage oil derivative to produce a blown corn stillage oil.

10. The method of claim 9, wherein the blown corn stillage oil has a viscosity of at least 50 cSt at 40° C.

11. The method of claim 9, wherein the blown corn stillage oil exhibits a viscosity at 100° C. of at least 8 cSt.

12. The method of claim 9, wherein the blown corn stillage oil has a viscosity less than 250 cSt at 40° C.

13. The method of claim 9, wherein the blown corn stillage oil has a Gardner color of 5 to 8.

14. The method of claim 9, wherein step (c) comprises passing air through the corn stillage oil derivative for from 3 hours to 12 hours.

15. The method of claim 9, wherein the corn stillage oil comprises from 9 wt % to 15 wt % free fatty acids.

16. The method of claim 15, wherein the blown corn stillage oil has at most 10 relevant percent more free fatty acids than the corn stillage oil.

17. A method for producing a blown-corn stillage oil, the method comprising:
   (a) obtaining a corn stillage oil having a Gardner color of at least 12;
   (b) heating the corn stillage oil to at least 90° C. for a sufficient period of time to obtain a corn stillage oil derivative; and
   (c) passing air through the corn stillage oil derivative to produce a blown-corn stillage oil having a Gardner color of from 5 to 8.

18. The method of claim 17, wherein the blown corn stillage oil has a viscosity of at least 50 cSt at 40° C.

19. The method of claim 17, wherein the corn stillage oil is vacuum distilled corn stillage oil.

20. The method of claim 17, wherein the corn stillage oil is pressure distilled corn stillage oil.

* * * * *